United States Patent [19]

Cousseau et al.

[11] Patent Number: 4,936,221
[45] Date of Patent: Jun. 26, 1990

[54] CONVEYOR FOR HANGERS, IN PARTICULAR GARMENT HANGERS

[75] Inventors: Joseph Cousseau; Joël Cousseau, both of Cerizay, France

[73] Assignee: Jice Automation, Les Herbiers Cedex, France

[21] Appl. No.: 298,978

[22] Filed: Jan. 19, 1989

[51] Int. Cl.⁵ .................... B65G 47/48; B61B 3/00
[52] U.S. Cl. ........................... 104/88; 104/91; 104/111; 104/125
[58] Field of Search ............ 104/88, 170, 89, 91, 104/111, 115, 125, 126, 172.4, 172.1, 172.2; 198/346.2, 465.4, 683, 684, 687

[56] References Cited

U.S. PATENT DOCUMENTS

| | | | |
|---|---|---|---|
| 1,960,719 | 5/1934 | Stibbs | 198/684 |
| 2,201,013 | 5/1940 | Rosenthal | 104/88 |
| 2,476,497 | 7/1949 | Landahl | 198/683 |
| 2,688,931 | 9/1954 | Spafford | 104/88 |
| 2,916,034 | 12/1959 | Detwiler | 104/126 |
| 2,995,094 | 8/1961 | Wallace | 104/126 |
| 3,376,828 | 4/1968 | Hager et al. | 104/91 |
| 3,411,456 | 11/1968 | Stevens | 104/172.4 |
| 3,688,445 | 9/1972 | Long | 104/172.4 |
| 3,858,519 | 1/1975 | Masino et al. | 104/88 |
| 4,070,972 | 1/1978 | Folsom et al. | 104/172.4 |
| 4,114,538 | 9/1978 | Nicodemus et al. | 104/88 |
| 4,726,462 | 2/1988 | Grube et al. | 104/88 |
| 4,736,687 | 4/1988 | Grube et al. | 104/88 |

FOREIGN PATENT DOCUMENTS

| | | | |
|---|---|---|---|
| 0639153 | 2/1964 | Belgium | 198/683 |
| 0208876 | 2/1908 | Fed. Rep. of Germany | 104/91 |
| 2031468 | 11/1970 | France . | |
| 2142980 | 2/1973 | France . | |
| 0086799 | 1/1956 | Norway | 104/126 |
| 2168938 | 2/1986 | United Kingdom . | |

Primary Examiner—Andres Kashnikow
Assistant Examiner—Mark T. Le
Attorney, Agent, or Firm—Sixbey, Friedman, Leedom & Ferguson

[57] ABSTRACT

A conveyor for hangers, the conveyor comprising a frame supporting a closed loop main circuit on which hangers are caused to move in a displacement direction by drive mechanisms, the conveyor further including a series of branches each including an inlet slope and an outlet slope both of which are selectively connectable to the main circuit by moving switches, said main circuit being generally circular and said branches being disposed substantially radially on the outside of the main circuit.

8 Claims, 2 Drawing Sheets

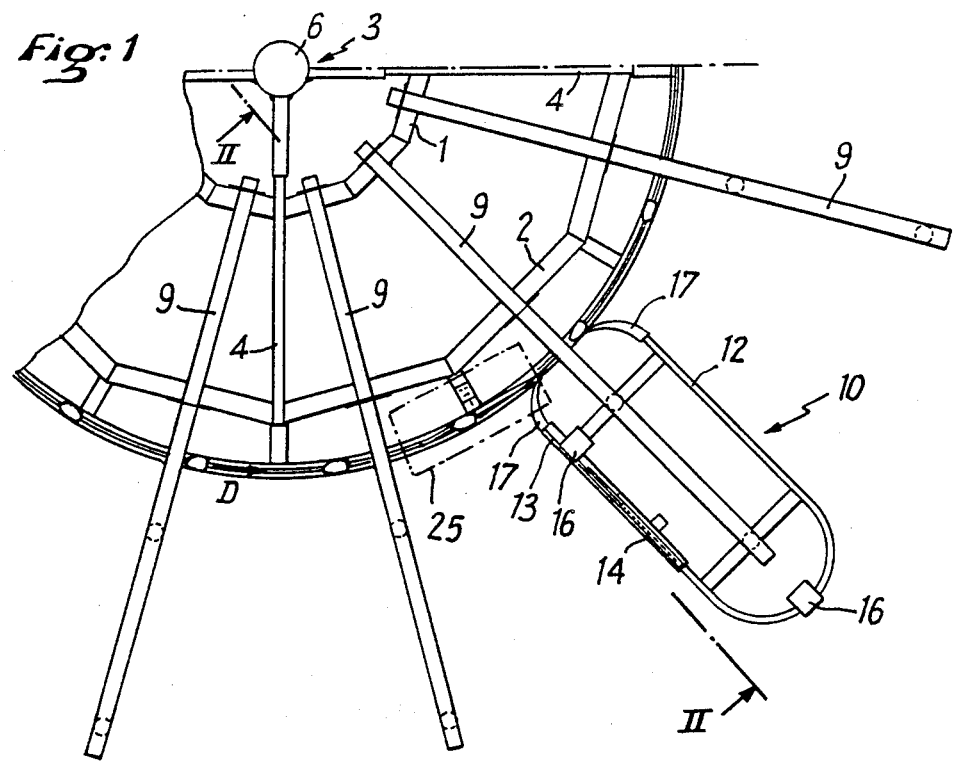
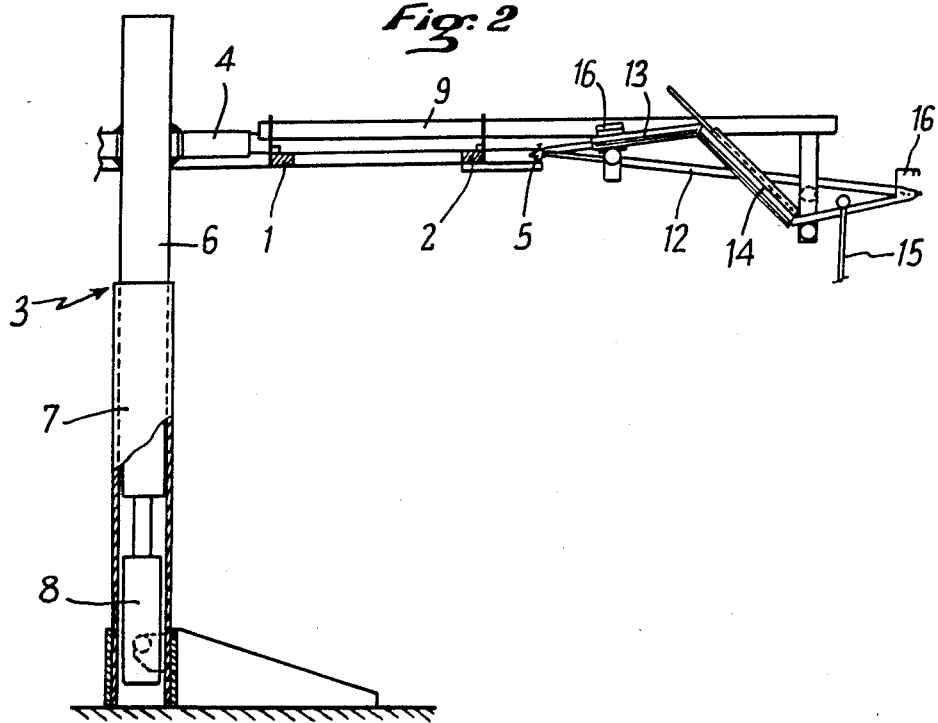

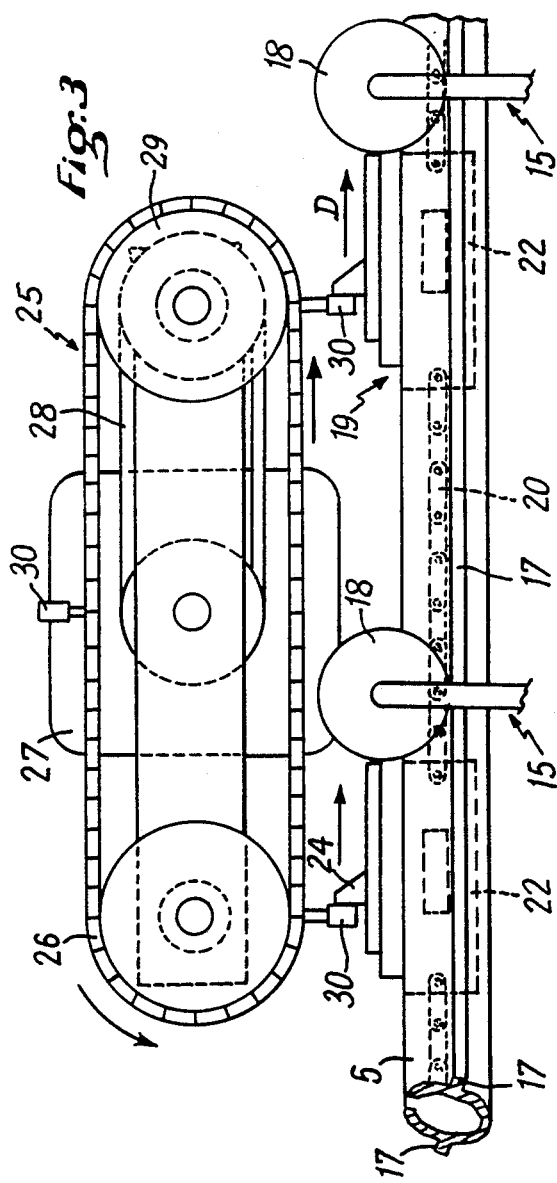
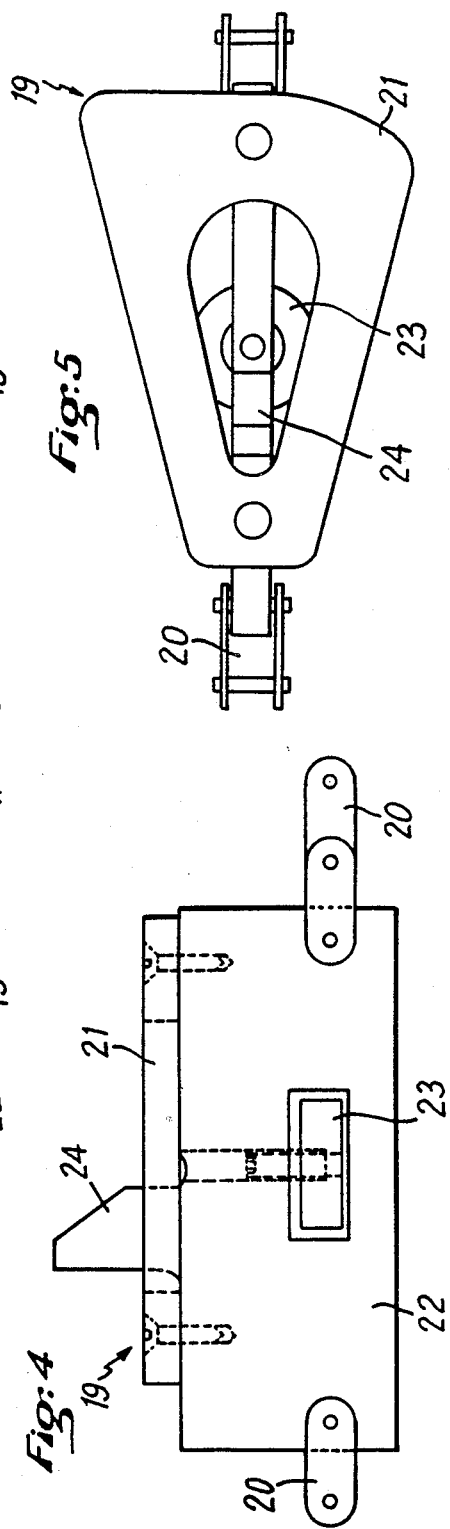

CONVEYOR FOR HANGERS, IN PARTICULAR GARMENT HANGERS

The present invention relates to a conveyor for hangers from which workpieces may be suspended. A conveyor of this type is particularly, but not exclusively, suitable for moving garments from one work station to another while they are being made up.

BACKGROUND OF THE INVENTION

Conveyors already exist for moving hangers. In general, such conveyors have a main closed loop circuit occupying a substantially horizontal plane, and a plurality of branches corresponding to work stations, with each branch including a downwardly sloping inlet branch for bringing hangers to a work station and an upwardly sloping outward branch for returning the hangers back up to the main circuit. The branches are conventionally disposed on either side of rectilinear portions of the main circuit.

However, it has been observed that such a disposition requires a main circuit which is of considerable length and requires an installation occupying considerable floor space.

An object of the present invention is to provide a smaller-sized conveyor for hangers which is preferably capable of being adapted to different working conditions.

SUMMARY OF THE INVENTION

To this end, the present invention provides a conveyor for hangers, the conveyor comprising a frame supporting a closed loop main circuit on which hangers are caused to move in a displacement direction by drive means, the conveyor further including a series of branches each including an inlet slope and an outlet slope both of which are selectively connectable to the main circuit by moving switches, said main circuit being generally circular and said branches being disposed substantially radially on the outside of the main circuit.

For a given number of work stations, it has been observed that this reduces the floor area occupied by about 30% compared with prior art conveyors. In addition, by putting all of the branch lines on the outside of the main circuit, there are no longer any operators subjected to the "boxed-in" feeling which is common to operators working on branches disposed on the inside of a main circuit.

According to an advantageous aspect of the invention, the main circuit and the branches are mounted on a central post which is adjustable in height. The height at which the workpieces are transported can thus easily be adjusted by acting on the height of the central post. This disposition is particularly advantageous when working up garments of different sizes, since each garment is preferably presented to a work station at a given height in order to facilitate performing work thereon.

In a particular embodiment of this aspect of the invention, the central post comprises a load carrying central column slidably mounted in a tubular stand, together with means for locking the central column in position relative to the tubular stand. The post preferably further includes a hydraulic actuator disposed inside the tubular stand and connected at one end to the tubular stand and at its other end to the central column such that the actuator constitutes means for moving the central column relative to the tubular stand, in addition to locking it in position.

In a preferred embodiment of the invention, the frame comprises two concentric rings connected to the central post by radial supporting arms which carry the running path of the closed loop main circuit, with the concentric rings carrying fixing elements disposed radially and supporting the branches. This provides a conveyor which is very simple in structure while nevertheless being highly effective.

According to yet another aspect of the invention, in combination with a conveyor in which the main circuit comprises a tubular section member and in which the drive means comprise thrust members connected to one another by link members disposed inside the tubular section member, the thrust members are themselves driven by a drive device disposed above the main circuit and comprising an endless chain driven by a motor and including drive plates projecting from the endless chain, while the thrust members preferably include respective horizontal plates connected to the link members and respective projecting lugs against which the drive plates bear when the endless chain is driven by the motor. This provides continuous drive of the set of thrust members by means of a drive device which is relatively compact.

BRIEF DESCRIPTION OF THE DRAWINGS

An embodiment of the invention is described by way of example with reference to the accompanying drawings, in which:

FIG. 1 is a fragmentary plan view of a conveyor in accordance with the invention;

FIG. 2 is a diagrammatic elevation view on line II—II of FIG. 1;

FIG. 3 is a diagrammatic elevation view of a drive device for driving the thrust members;

FIG. 4 is an elevation view of a thrust member; and

FIG. 5 is a plan view of a thrust member.

MORE DETAILED DESCRIPTION

With reference to the drawings, a conveyor in accordance with the invention comprises a frame constituted by first and second concentric rings 1 and 2 connected to a central post given an overall reference 3 by four radial supporting arms 4 whose ends support a main circuit 5 which is circular in shape.

The central post 3 comprises a load-carrying central column 6 slidably mounted in a tubular stand 7 which is fixed to the floor by any appropriate means. A hydraulic actuator 8 is disposed inside the tubular stand 7 with one of its ends being connected to the tubular stand and with its other end being connected to the central column, such that the actuator 8 simultaneously constitutes means for moving the central column 6 relative to the tubular stand 7 and also means for locking the central column 6 at a given height relative to the tubular stand 7.

Fixing elements 9 are carried by the conecentric rings 1 and 2 and project radially outwardly beyond the circle formed by the main circuit 5. It the embodiment shown, there are 12 fixing elements 9 and each of them supports, in turn, branches which are given an overall reference 10. In order to simplify the drawing, only one branch is shown in FIG. 1. Each of the branches 10 comprises, in conventional manner, an inlet slope 12 and an outlet slope 13 together with lift means 14 for raising the hangers 15 to the top portion of the branch. Each branch also includes two stop boxes 16 which are remotely controlled and which enable a serise of hangers to be stored on a branch.

Each of the branches has its inlet slope 12 disposed downstream from its outlet slope 13 relative to the displacement direction D of the workpiece-suspending hangers around the main circuit 5, with each of the slopes being selectively connectable to the main circuit 5 by moving switch blades 17, e.g. curved blades mounted to pivot about the axes of the inlet and outlet slopes 12 and 13 between respective raised positions where they are at a distance from the main circuit 5, and respective lowered positions where they are in contact with the outside edge of the section member constituting the main circuit 5. Becasue of the structure described above, it will be observed that the branches 10 are disposed substantially radially, projecting from the outside of the main circuit 5. The main circuit 5 is constituted by a tubular section member (FIG. 3) having side fins 17 on which the wheels 18 of workpiece hangers 15 run. The hangers 15 are moved along the main circuit by drive means comprising thrust members generally designated 19 which are interconnected by link members, in this case links of chain 20 disposed inside the section member constituting the main circuit 5.

Each thrust member 19 comprises a horizontal plate 21 fixed to a vertical plate 22 which is held centered in the section member 5 by a centering wheel 23. The vertical plates 22 of the various thrust members 19 are interconnected by chain elements 20. The top of each plate 22 includes a lug 24 passing through an opening in the horizontal plate 21 and projecting above the horizontal plate.

The thrust members 19 are themselves driven by a drive device given an overall reference 25 and shown symbolically in FIG. 1, while being shown in greater detail in FIG. 3. The drive device 25 is disposed above the main circuit 5 and comprises an endless chain 26 driven by a motor 27, e.g. an electric motor, via a belt 28 driving a stepdown sprocket 29. The endless chain 26 has drive plates 30 projecting outwardly therefrom and bearing in succession against lugs 24 whenever the endless chain 26 is driven by the motor 27. In this context, it may be observed that the drive plates 30 are spaced apart on the chian 26 by a distance which is equal to or slightly greater than the distance between the lugs 24 so as to ensure that there is always at least one drive plate 30 bearing against a lug 24 on a thrust plate 19.

The conveyor of the invention operates as follows:

Initially trhe height of the conveyor is adapted to match the workpieces it conveys by acting on the actuator 8. Thereafter, the motor 27 is switched on causing the endless chain 26 to rotate. At least one of its drive plates bears against the lug 24 one of the thrust members 29, and since the thrust members 19 are interconneted by chain elements 20, the entire set of thrust members 19 is displaced around the main circuit 5. When a hanger 15 is to be placed on a branch, the corresponding switch blade 17 is lowered at the end of the inlet slope. A series of hangers 15 can thus be stored on the inlet slope 12 and the same operation can be performed in succession on the various workpieces carried by said series of hangers. If a second operation is to be performed at the same work station on a series of workpieces, the switch blades 17 are moved simultaneously into contact with the main circuit 5 when the hanger carrying the corresponding workpiece leaves the branch, thereby automatically recycling the same hanger over the same branch. Otherwise, workpieces need to be conveyed to some other work station, in which case only the switching blade 17 at the end of the outlet slope 13 is brought into contact with the main circuit 15 and the corresponding hanger is thus moved along the main circuit to some other branch.

Naturally, the invention is not limited to the embodiment described and the person skilled in the art may vary it in numerous ways. In particular although the main circuit is preferably a true circle, it would also be possible to use a main circuit which is oblong or elliptical without going beyond the scope of the invention.

In this context, it may be observed that by virtue of the radial disposition of the branches outside a curvilinear main circuit, a considerable saving in main circuit length is achieved. In a linear installation for making up garments, it is generally necessary to provide 1.2 meters (m) for each branch. In contrast, with a circular main circuit, it has been observed that 12 branches can easily be installed on a main circuit having a diameter of 3 m, i.e. a circumference of about 9 m, thus allocating about 0.75 m of main circuit to each branch. This disposition thus provides not only a saving in space but also a saving in transport time by virtue of the shorter distance to be travelled by the hangers.

We claim:

1. A conveyor for hangers, the conveyor comprising a frame supporting a closed loop main circuit on which hangers are caused to move in a displacement direction by drive means, the conveyor further including a series of branches each including an inlet slope and an outlet slope both of which are selectively connectable to the main circuit by moving switches, said main circuit being generally circular and said branches being of elongated form and having a longitudinal dimension extending substantially radially on the outside of the main circuit.

2. A conveyor according to claim 1, wherein the main circuit and the branches are mounted on a central post which is adjustable in height.

3. A conveyor according to claim 2, wherein the central post comprises a load carrying central column slidably mounted in a tubular stand together with means for locking the central column relative to the tubular stand.

4. A conveyor according to claim 3, including means for moving the central column relative to the tubular stand.

5. A conveyor according to claim 4, wherein said means for moving the central column relative to the tubular stand comprise a hydraulic actuator disposed inside the tubular stand with one end of the actuator connection to the tubular stand and with the other end of the actuator connected to the central column.

6. A conveyor according to claim 1, in which the frame comprises two concentric rings connected to a central post by radial support arms carrying the main circuit, and in which the concentric rings carry fixing elements disposed radially and supporting the branches.

7. A conveyor according to claim 1, in which the main circuit comprises a tubular section member and the drive means comprise thrust members connected to one another by link members disposed inside the section member, with the thrust members themselves being driven by a drive disposed above the main circuit and including an endless chain driven by a motor with drive plates projecting from the endless chain.

8. A conveyor for hangers according to claim 7, in which each thrust member comprises a horizontal plate connected to the link members and a projecting lug against which the drive plates bear when the endless chain is driven by the motor.

* * * * *